United States Patent [19]

Abdoo

[11] 4,179,047
[45] Dec. 18, 1979

[54] CHEMICAL METERING APPARATUS
[76] Inventor: Alfred H. Abdoo, 2116 W. Encanto Blvd., Phoenix, Ariz. 85009
[21] Appl. No.: 890,248
[22] Filed: Mar. 27, 1978
[51] Int. Cl.² .............................................. B67D 5/60
[52] U.S. Cl. ..................................... 222/133; 137/268
[58] Field of Search ......................... 222/133; 137/268
[56]  References Cited
    U.S. PATENT DOCUMENTS

| | | | |
|---|---|---|---|
| 3,093,267 | 6/1963 | Lowery | 222/133 X |
| 3,401,116 | 9/1968 | Stanwood | 137/268 X |
| 3,430,823 | 3/1969 | Hunsaker | 137/268 X |
| 3,474,817 | 10/1969 | Bates et al. | 137/268 |

Primary Examiner—Allen N. Knowles
Attorney, Agent, or Firm—Herbert E. Haynes, Jr.

[57]   ABSTRACT

An apparatus for controlled dissolution and dispensing of a water treatment chemical including a chemical chamber disposed above a humidity chamber through which water flows at a controlled rate. A metering device controls the migration of moisture into the chemical chamber for dissolution of the chemical and for feeding of the chemical into the water passing through the humidity chamber. The water/chemical solution exiting from the humidity chamber enters into a settling chamber and is then directed to the water supply.

12 Claims, 4 Drawing Figures

CHEMICAL METERING APPARATUS

BACKGROUND OF THE INVENTION

1. Field of the Invention

This invention relates to devices for metering chemicals, and more particularly to an apparatus for controlled dissolution and metering the flow of a water treatment chemical into a water supply.

2. Description of the Prior Art

The problem of mineral deposits which build up on plumbing, appliances, and the like, which handle or utilize water in their operation is well known, and those problems are particularly severe in those regions having hard water. These well known mineral deposit have been known to cause equipment malfunctions and will, in general, decrease the operating efficiency and useful life of equipment.

By way of example, the problem of mineral deposition is particularly troublesome in air cooling devices which operate on an evaporation principle such as the device commonly called an "evaporative cooler".

Briefly, an evaporative cooler includes a centrifugal blower for drawing air into a housing through wettable excelsior pads so that evaporation will chill the air which is ultimately delivered to a point of use by the blower. The cooler housing usually includes a water reservoir or sump in the bottom thereof, and a pump for directing the water from the sump into a plumbing network which distributes the water to the excelsior pads to keep them wet, with the water passing through the pads and back into the sump. Thus, the evaporative cooler is seen to be a water recirculating device in which accelerated evaporation takes place, and the mineral deposit buildup in the pump, plumbing, pads, and all the other components of such a device is severe.

Many methods and devices have been tried in attempts to ease the mineral deposition problems in evaporative coolers and other equipment having such problems. However, no device or method known to me has functioned well enough to achieve commercial success.

One method that was tried without appreciable success was that of depositing controlled amounts of a chemical commonly called sodium glassy phosphates into the water supply. However, the nature of that chemical makes it difficult to meter controlled amounts thereof into a water supply, and that problem has heretofore not been overcome to the best of my knowledge.

Sodium glassy phosphates are versatile chemicals with desirable properties such as water softening, sequestering, peptizing and suspension of finely divided solids, scale and corrosion prevention. The glassy phosphates belong to a group of linear chain polymers commonly called "condensed phosphates" or "polyphosphates" and are sometimes referred to as "sodium hexametaphosphate".

The glassy phosphates can be dissolved in water to make concentrated solutions, but such solutions are viscous. When the glassy phosphates are in particulate form, such as powder or grandular, it can be dissolved in water provided that the water is well agitated. If the rate of agitation is insufficient, the glassy phosphate will settle to the bottom and form a gelatinous mass which is very slow to dissolve.

The above stated properties of glassy phosphates make is a very desirable chemical for water treatment purposes, however, the properties of that chemical make it difficult to use.

Therefore, a need exists for a new and useful apparatus for metering water treatment chemicals in general and sodium glassy phosphates in particular, into a water supply for treatment thereof.

SUMMARY OF THE INVENTION

In accordance with the present invention, a new and useful apparatus is disclosed for metering water treatment chemicals in general, and sodium glassy phosphates in particular, into a water supply for treatment thereof.

The apparatus includes a chamber for containing the water soluble chemical preferably in particulate form such as powdered or granular. The chemical chamber is disposed above a humidity chamber through which water flows at a controlled rate. A metering means is disposed between the chemical chamber and humidity chamber for controlling migration of moisture into the chemical chamber. The controlled amount of moisture which is allowed to enter the chemical chamber will cause dissolution of the chemical in the immediate area of the metering means and that dissolved chemical is fed by the metering means into the water passing through the humidity chamber. When the chemical enters the water in the humidity chamber it will form a relatively concentrated solution and mineral precipitation will commence immediately. The solution will exit from the humidity chamber and enter into a settling chamber which contains a filtering means for trapping precipitated materials, and the solution is then directed into a water body, or supply for treatment thereof.

Accordingly, it is an object of the present invention to provide a new and useful apparatus for controlled metering of a water treatment chemical.

Another object of the present invention is to provide a new and useful apparatus for controlled dissolution and metering of a water treatment chemical into a water supply.

Another object of the present invention is to provide a new and useful apparatus for controlled dissolution and metering of sodium glassy phosphate into a water supply.

Another object of the present invention is to provide a new and useful apparatus of the above described character which includes a chamber for containing a water treatment chemical in dry form, a humidity chamber below the chemical chamber with water flowing through the humidity chamber at a controlled rate, a metering means interconnecting the humidity and chemical chambers to control the migration of moisture into the chemical chamber for dissolution of the chemical, and for feeding of the dissolved chemical into the water passing through the humidity chamber, and a settling chamber through which the chemical/water solution passes on its way to a water supply.

The foregoing and other objects of the present invention, as well as the invention itself, may be more fully understood from the following description when read in conjunction with the accompanying drawings.

DESCRIPTION OF THE PREFERRED EMBODIMENT

Figure 1:
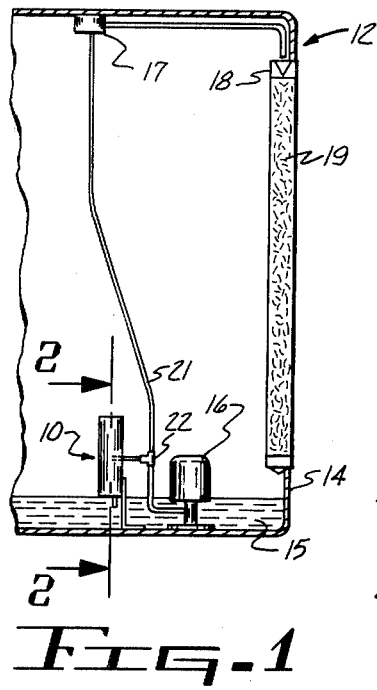
FIG. 1 is a fragmentary diagrammatic view showing a typical environment in which the apparatus of the present invention may be employed.

Referring more particularly to the drawings, FIG. 1 illustrates the chemical metering apparatus of the present invention, which is indicated in its entirety by the reference numeral 10, as being utilized in the water recirculation system of an evaporative cooler 12. It will be understood that the apparatus 10 can be employed in virtually any type of system in which water flows and the evaporative cooler 12 is shown for completeness of this description and thus is not to be considered as a limitation of the present invention.

As is well known, the evaporative cooler 12 is an air cooling device which includes a housing 14 having a water reservoir 15 formed in the bottom thereof. A pump 16 is located in the reservoir and will pump water from the reservoir into a water distribution network 17. Water in the network is directed into a trough 18 which is positioned immediately above an excelsior pad 19. The trough will distribute water evenly along the top of the excelsior pad, and gravity will cause the water to wet the entire pad. It should be noted that the drawing of FIG. 1 is in simplified form and that an evaporative cooler usually is provided with an excelsior pad on each side of the housing, and thus, the cooler also includes a plurality of troughs and the water distribution network is configured to wet each one of the pads. In any event, water will flow through the excelsior pad 19 and is returned to the reservoir 15 for recirculation. A centrifugal blower (not shown), is provided within the housing 14 and will move air into the housing through the excelsior pad 19 which will chill the air by evaporation, and the chilled air is moved by the blower to a point of use (not shown).

Figure 2:
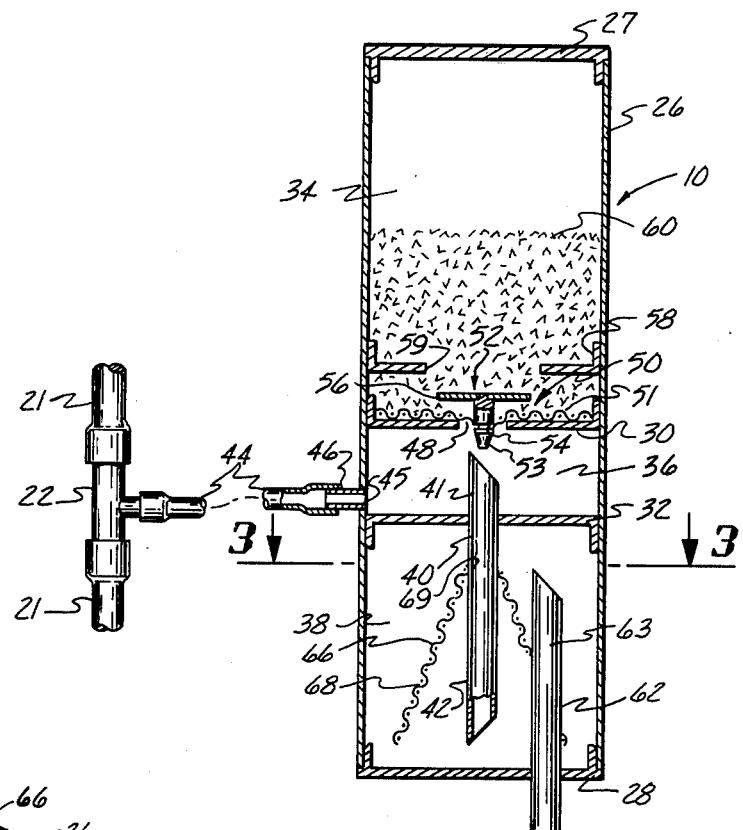
FIG. 2 is an enlarged sectional view of the apparatus of the present invention taken along the line 2—2 of FIG. 1.
Figure 3:
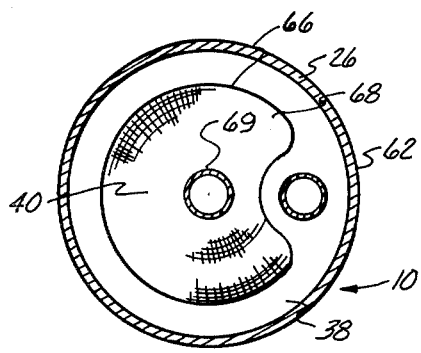
FIG. 3 is a sectional view taken along the line 3—3 of FIG. 2.

In order to eliminate, or at least substantially reduce, mineral deposition on the various components of the above described evaporative cooler 12, or in other mechanisms and systems where mineral deposition is a problem, the apparatus 10 is coupled into a pipeline such as the pump output line 21 in the evaporative cooler 12. Such coupling may be accomplished in any convenient manner, for example, by utilizing a tee 22 as seen best in FIG. 2.

The chemical metering apparatus 10 includes a housing 26 which is preferrably of cylindrical configuration and is closed at its upper end by a top cap 27, and is closed at its bottom end with a bottom cap 28. The housing is provided with an upper partition or wall 30 and a lower partition or wall 32 which forms a chemical compartment 34 in the uppermost portion of the housing 26, an intermediate humidity compartment 36 immediately below the chemical compartment, and a settling compartment 38 immediately below the humidity compartment.

A first overflow pipe 40 is located centrally in the lower partition 32 and extends normally therefrom to provide an upwardly extending portion 41 and a downwardly extending portion 42. Water from the pipeline 21 will flow from the coupling tee 22 through a suitable hose 44 and will enter into the humidity compartment 36 through a bore 45 formed through a boss 46 mounted on the side of the housing 26. The water directed into the humidity compartment 36 will be supplied at a rate determined by line pressure and the size of the bore 45, and will be maintained at a level determined by the location of the uppermost end of the first overflow pipe 40. Thus, as long as water is being supplied to the humidity compartment, water flow through the overflow pipe 40 will be at a rate equal to the rate at which it is supplied, and the water flowing through the first overflow pipe 40 is fed to the bottom of the settling compartment 38 as will hereinafter be described in detail.

The upper partition 30 is provided with a central aperture 48 formed therethrough so as to communicate between the chemical compartment 34 and the humidity compartment 36 and a metering means 50 is disposed in that aperture.

The metering means 50 includes a screen 51 which is disposed in contiguous engagement with the upper surface of the upper partition 30, and is configured to substantially conform to the shape of the partition and span the central aperture 48 formed therethrough. A metering pin 52 is carried by the screen 51 in a position so that the shank 53 of the pin is normally disposed with respect to the partition 30 and passes through the aperture 48. Mounting of the metering pin 52 in the screen 51 may be accomplished in any suitable manner such as by forming an annular groove 54 in the shank 53 of the pin, and passing the pin through the screen so that the material of the screen will enter into the groove and thus hold the pin in place. The metering pin is provided with a planar or disc shaped head 56 and the metering means 50 may also include a baffle 58, the purposes of which will hereinafter be described in detail.

The chemical compartment 34 contains a water treatment chemical 60 which is preferrably in particulate form such as powdered or granulated, and the ideal chemical is sodium glassy phosphate. As is known, glassy phosphate is water soluble and unless the dissolution thereof is controlled, it will turn into a mass of gelatinous-like viscous material. Thus, the metering means 50 is designed to control the migration of moisture from the humidity compartment 36 into the chemical compartment 34 by limiting the migration to that portion of the chemical which is disposed proximate the aperture 48 of the partition 30. In this manner, moisture in the humidity compartment will be absorbed by the chemical 60 in the immediate vicinity of the metering pin 52 and dissolution will occur at a relatively slow rate. The dissolved glassy phosphate will flow down the shank 53 of the pin 52 and will be deposited into the water that is exiting the humidity chamber 36 through the first overflow pipe 40.

Deposition of the dissolved chemical into the water as described above will form a relatively concentrated solution of the water and dissolved chemical and that concentrated solution will ultimately be directed into a water supply, or body (not shown), for treatment thereof.

The screen 51 of the metering means 50, in addition to holding the metering pin 52 and the particulate chemicals 60, will prevent or at least retard, lateral migration of moisture which would otherwise eventually form a viscous virtually immovable layer of the chemical atop the upper partition 30. If such lateral moisture migration were allowed to occur, it would stop gravity flow of the dry chemical into the vicinity of the metering pin 52 to replace that which is dissolved and metered into the water in the humidity compartment.

The planar, or disc shaped, head 56 provided on the metering pin 52 restricts vertical migration of moisture to the immediate vicinity of the metering pin 52 and thus prevents unwanted vertical moisture migration which would render the apparatus 10 inoperative in the manner similar to that described above.

The baffle 58 is spaced above the enlarged planar head 56 of the metering pin 52, and is provided with a central aperture 59 which is larger than the planar head 56. Although the apparatus 10 will function without the baffle 58, it has been found that the baffle aids the head in preventing vertical moisture migration.

A second overflow pipe 62 is provided in the apparatus 10 and is mounted so as to extend through the bottom cap 28. The upper portion 63 of the second overflow pipe 62 has its uppermost end located near the top of the settling compartment 38 so that the level of concentrated solution in the settling compartment will be maintained at a point determined by the location of the top of the overflow pipe 62. Thus, the concentrated solution entering the settling compartment 38 from the bottom end of the first overflow pipe 40, will flow upwardly to the top of the second overflow pipe 62 and will exit the apparatus 10 through the second overflow pipe.

When the chemical 60 is dissolved, as described above, and is metered into the water exiting the humidity compartment 36, mineral precipitation will occur. Thus, the concentrated solution entering the settling compartment 38 will contain precipitated minerals which will settle to the bottom of the settling compartment due in part to the upward flow of the solution therein. To enhance the settling of the precipitated minerals, a filtering means 66 is disposed in the settling compartment 38 so that the upward flow of the concentrated solution will pass through the filtering means 66. This filtering function may be accomplished in any of several well known manners, such as by passing the solution through diatomaceous earth, sand, a paper filtering element, and the like. However, the preferred filter is a screen 68 of conical configuration having an aperture 69 formed in its apex so that it will circumscribe the downwardly extending portion 42 of the first overflow pipe 40 at a location just below the lower partition 32.

It should be noted that in some installations, passing of the concentrated solution containing the precipitated minerals into the water supply to be treated would be an acceptable procedure and in such cases, the apparatus 10 would be fabricated without a settling compartment 38. In such a configuration, the first overflow pipe 40 would carry the concentrated solution directly out of the apparatus 10.

Figure 4:
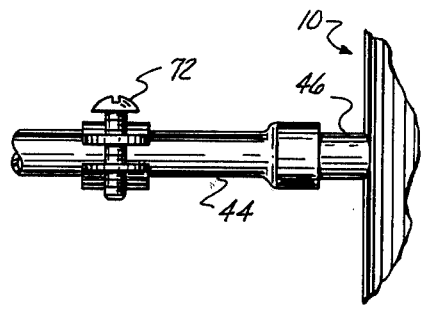
FIG. 4 is a fragmentary view illustrating a modification of the apparatus of the present invention.

In some instances, water line pressure may vary and this, of course, would vary the rate of water flow through the humidity compartment 36 and the flow rate of concentrated solution through the settling compartment 38. If line pressure dropped, the rate of flow through the apparatus 10 would drop and the solution would become more concentrated and similarly if the line pressure increased, the flow rate through the apparatus would increase and the degree of solution concentration would be reduced. Therefore, to compensate for variations in water line pressure and/or to adjust the degree of concentration of the solution, the apparatus 10 may be provided with a flow adjustment means 72 such as the hose clamp shown in FIG. 4. It will be appreciated that the flow control adjustment may be accomplished in many ways such as by employing any well known type of adjustable flow control valve (not shown), providing an adjustable orifice (not shown) in the inlet boss 46, and the like.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An apparatus for controlled dissolution and metering of a dry water soluble water treatment chemical comprising:
   (a) a housing having a closed top and bottom;
   (b) a partition in said housing to provide a chemical compartment therein immediately above a humidity compartment;
   (c) a dry water treatment chemical in said chemical compartment, said water treatment chemical in powdered or granulated form and having the characteristic of dissolving into a liquid upon being exposed to moisture in vaporous form;
   (d) inlet means on said housing for supplying water to said humidity compartment for production of moisture in vaporous form;
   (e) outlet means in said housing for allowing water to exit from said humidity compartment; and
   (f) metering means on said partition and communicating between said chemical compartment and said humidity compartment, said metering means for controlling the migration of the moisture in vaporous form from said humidity compartment to said chemical compartment to control the dissolution of said chemical and for metering the liquified chemical into the water flowable through said humidity compartment.

2. An apparatus as claimed in claim 1 wherein said metering means comprises:
   (a) said partition having an aperture formed therethrough;
   (b) a screen in contiguous engagement with the upwardly disposed surface of said partition and substantially conforming to the configuration thereof, said screen spanning the aperture formed through said partition; and
   (c) metering pin means extending normally and oppositely through said screen and disposed to extend through the aperture formed in said partition.

3. An apparatus as claimed in claim 2 wherein said metering pin means comprises:
   (a) a shank extending through said screen so that its lower end extends into said humidity compartment and its upper end extends into said chemical compartment; and
   (b) an enlarged head of substantially planar configuration mounted on the upper end of said shank.

4. An apparatus as claimed in claim 2 and further comprising a baffle mounted in said housing so as to be spaced above said metering pin means, said baffle having an aperture formed therethrough which is disposed in vertical alignment with said metering pin means.

5. An apparatus as claimed in claim 1 wherein said metering means comprises:
   (a) said partition having an aperture formed therethrough;
   (b) a screen interposed between said chemical and the upper surface of said partition and disposed to span the aperture formed therein, said screen in contiguous engagement with and substantially conforming to the configuration of said partition so that the moisture which migrates from said humidity compartment into said chemical compartment will be prevented from migrating laterally on the upper surface of said partition; and
   (c) a metering pin including,
      I. a shank extending through said screen and through the aperture of said partition, said shank having a lower end extending into said humidity compartment and an upper end extending into said chemical compartment, and
      II. an enlarged head of substantially planar configuration on the upper end of said shank, said head spaced above the aperture of said partition to retard vertical moisture migration from said humidity compartment into said chemical.

6. An apparatus as claimed in claim 5 wherein said metering means further comprises a baffle mounted in said housing above the enlarged head of said metering pin, said baffle having an aperture which is disposed in vertical alignment with the enlarged head of said metering pin and is larger than the enlarged head of said metering pin.

7. An apparatus as claimed in claim 1 wherein said inlet means and said outlet means are configured so that water will flow out of said humidity compartment at a rate equal to the rate at which it enters said humidity compartment and will maintain water at a predetermined level therein.

8. An apparatus as claimed in claim 1 and further comprising:
   (a) a second partition in said housing and disposed to form the bottom of said humidity chamber and to provide a settling chamber below said humidity chamber;
   (b) said outlet means being a first overflow pipe having an upper portion extending above said second partition and a lower portion which extends below said second partition to a point adjacent the bottom of said housing; and
   (c) a second overflow pipe extending through the bottom of said housing and having an upper portion which extends upwardly to a point adjacent said second partition.

9. An apparatus as claimed in claim 8 and further comprising filter means in said settling compartment and disposed between the lowermost end of said first overflow pipe and the uppermost end of said second overflow pipe, said filtering means for filtering precipitated minerals from the solution of water and dissolved chemicals flowing between the lowermost end of said first overflow pipe and the uppermost end of said second overflow pipe.

10. An apparatus as claimed in claim 9 wherein said filter means comprises a screen of conical configuration.

11. An apparatus as claimed in claim 1 and further comprising an adjustable flow control means coupled to said inlet means for controlling the flow rate of water through said humidity compartment.

12. An apparatus as claimed in claim 1 wherein said chemical is sodium glassy phosphate.

* * * * *